(No Model.) 6 Sheets—Sheet 3.
G. JOHNSON, Jr.
PLANING AND MATCHING MACHINE.
No. 338,973. Patented Mar. 30, 1886.
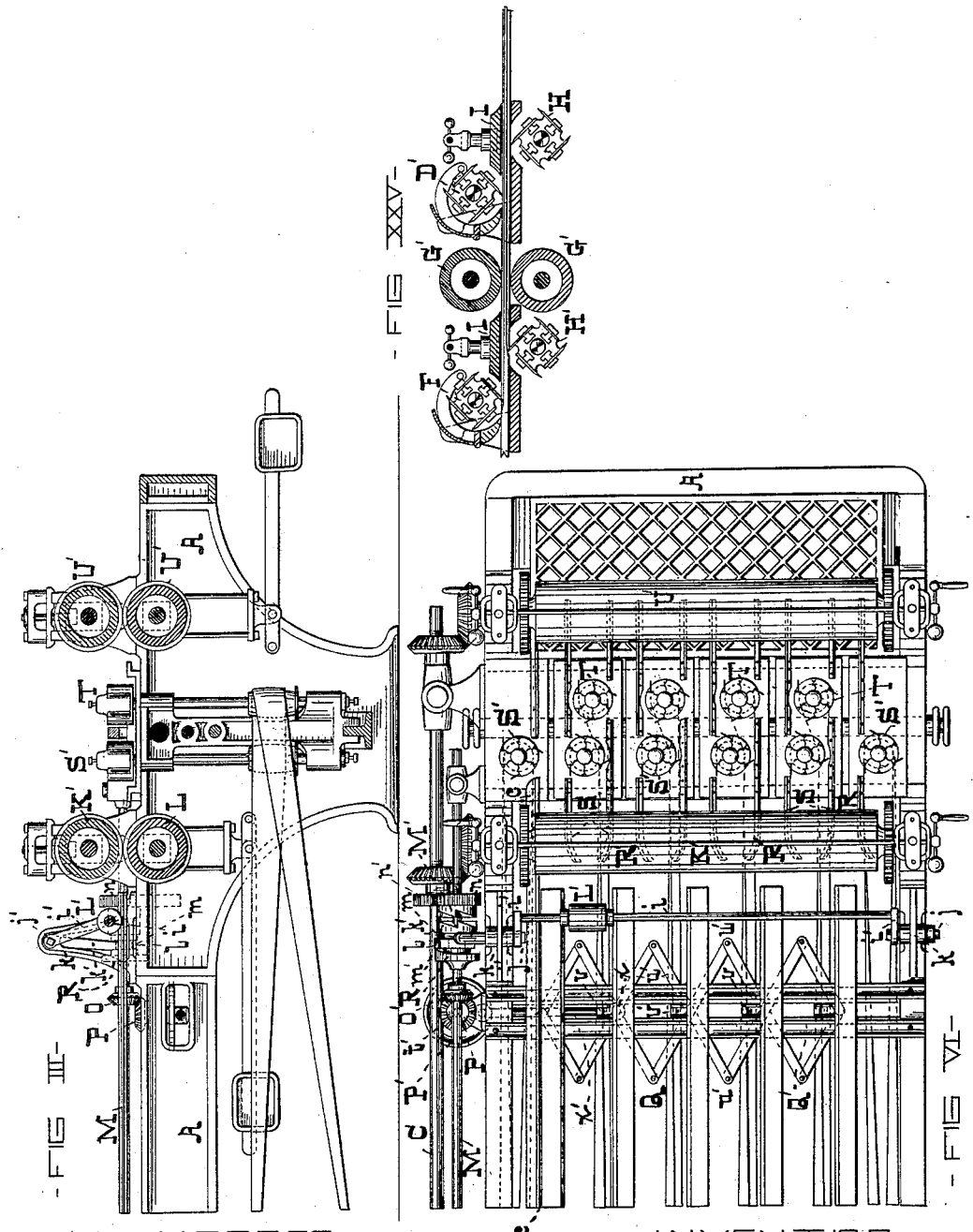
WITNESSES:
Edward A. Osse,
Chas. W. Arnold.
INVENTOR:
Gunleaf Johnson, Jr.,
by G.H. & H.T. Howard,
ATTORNEYS.

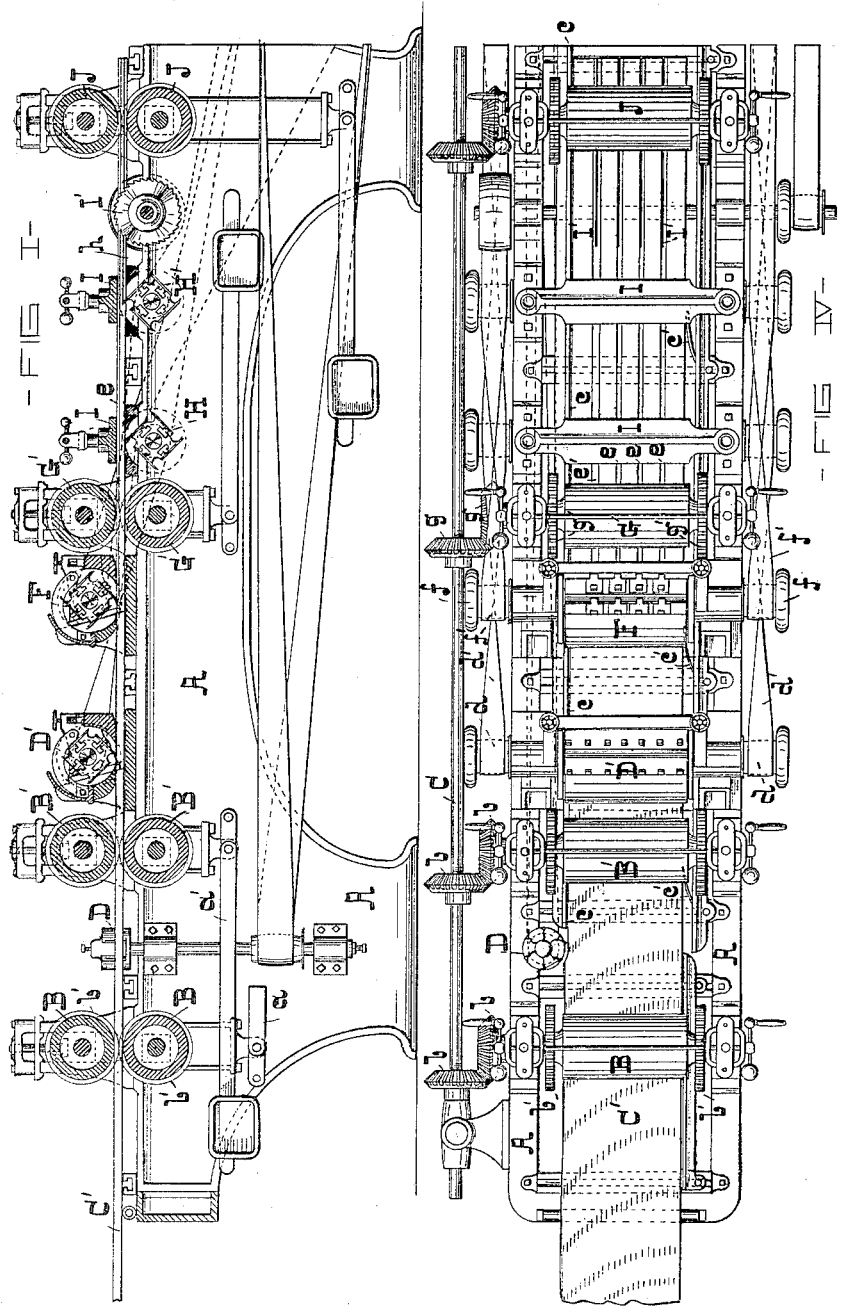

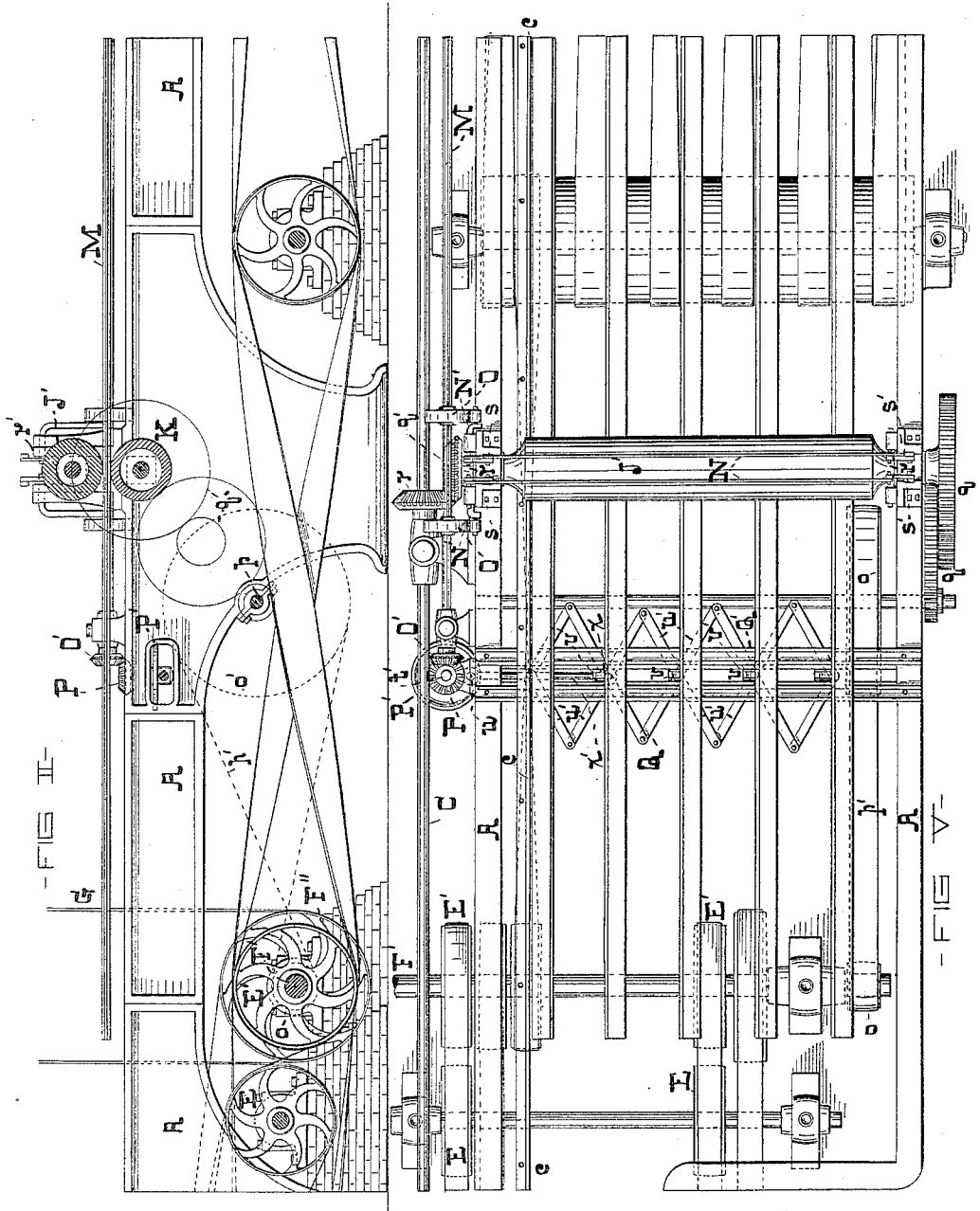

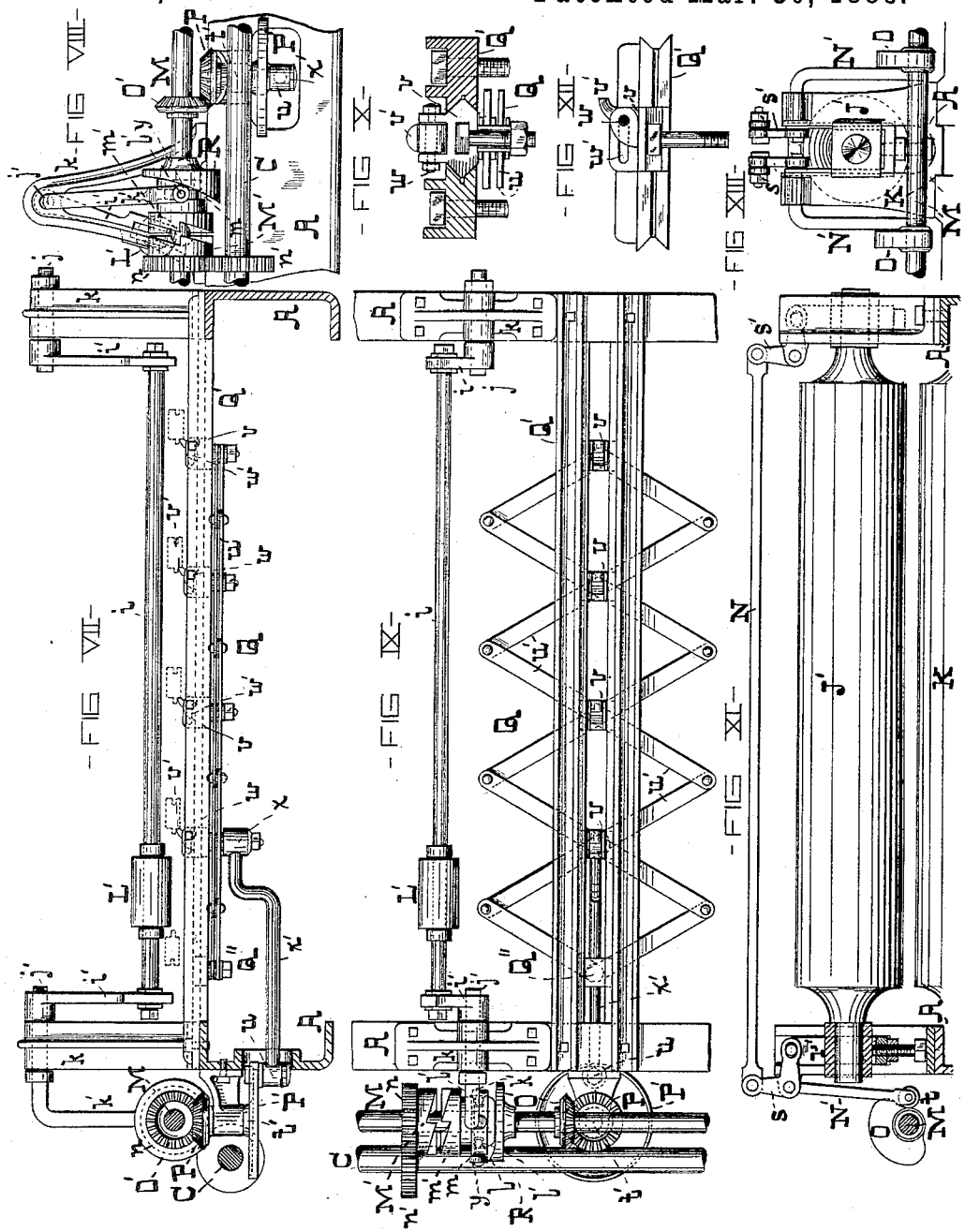

(No Model.) 6 Sheets—Sheet 5.
G. JOHNSON, Jr.
PLANING AND MATCHING MACHINE.
No. 338,973. Patented Mar. 30, 1886.
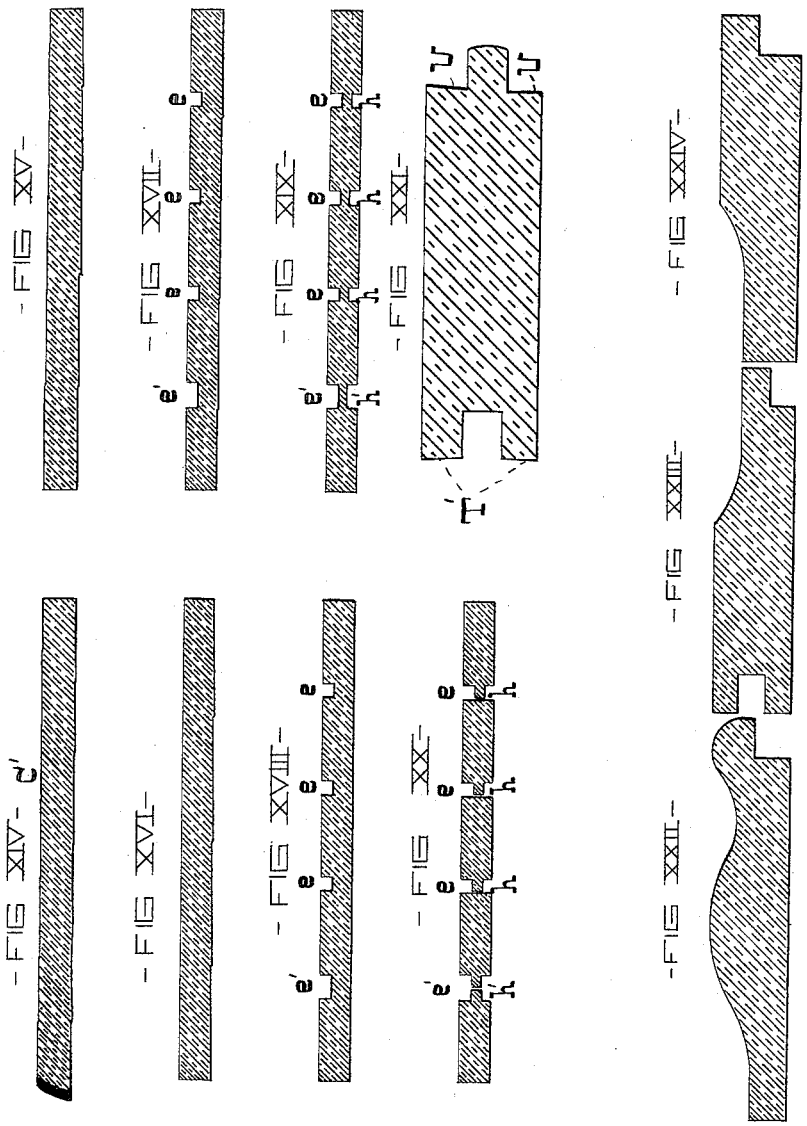
WITNESSES:
Edward A. Osse,
Charles W. Arnold
INVENTOR:
Greenleaf Johnson, Jr.,
by G. H. & W. S. Howard,
ATTORNEYS.

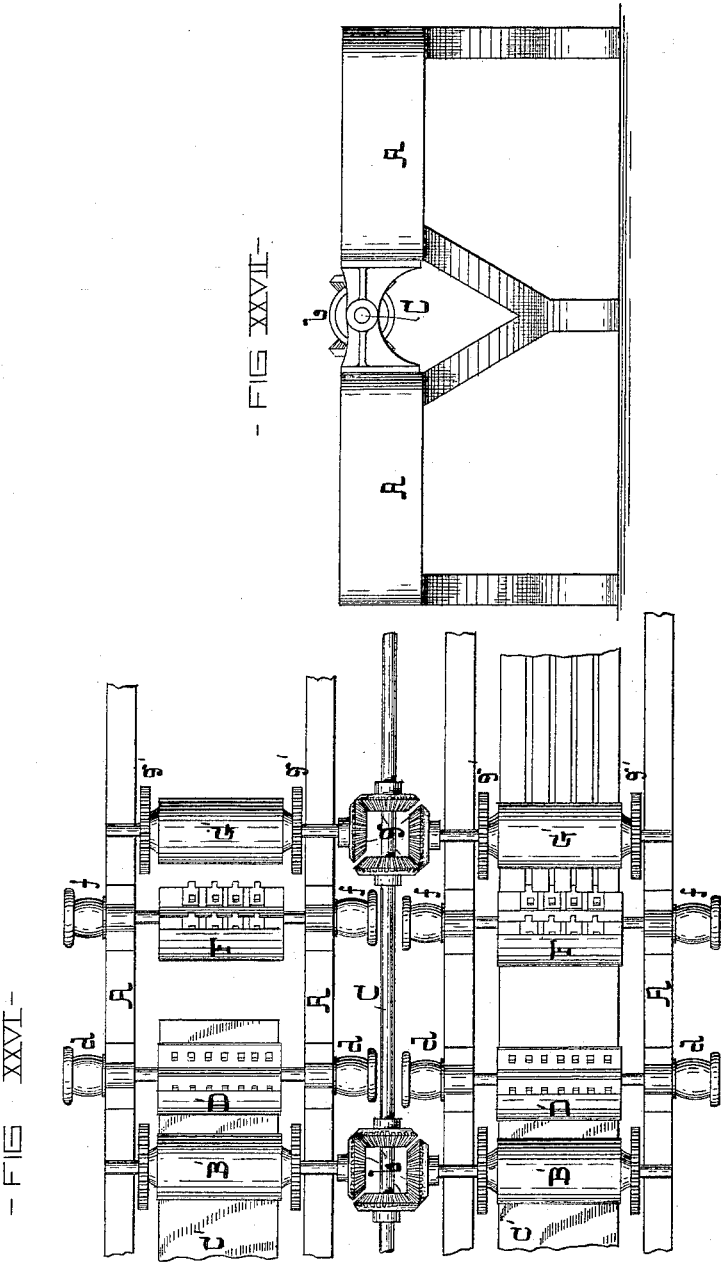

UNITED STATES PATENT OFFICE.

GREENLEAF JOHNSON, JR., OF BALTIMORE, MARYLAND.

PLANING AND MATCHING MACHINE.

SPECIFICATION forming part of Letters Patent No. 338,973, dated March 30, 1886.

Application filed April 27, 1885. Serial No. 163,628. (No model.)

*To all whom it may concern:*

Be it known that I, GREENLEAF JOHNSON, Jr., of the city of Baltimore, and State of Maryland, have invented certain Improvements in Machines for Making Tongue-and-Groove Flooring, of which the following is a specification.

In the drawings forming a part hereof, Figures I, II, and III, taken together, represent a side elevation of the improved machine, and Figs. IV, V, and VI a top or plan view of the same. Figs. VII to XIII, inclusive, are details of the invention on an enlarged scale. Figs. XIV to XX, inclusive, are cross-sections of a board, illustrating its condition at various stages of the operation to which it is subjected, beginning with a rough plank, as hereinafter described. Fig. XXI is a cross-section of a completed piece of flooring, the same being shown on an enlarged scale. Fig. XXII, XXIII, and XXIV are cross-sections of different kinds of weather-boarding. Fig. XXV illustrates a modification in the arrangement of certain parts of the invention, as hereinafter described. Figs. XXVI and XXVII illustrate further modifications of the invention.

A is the frame of the machine, which may be of any appropriate design.

B B and B' B' are respectively the first and second pair of feed-rolls, which correspond in all essential particulars with those ordinarily used in planing-machines, and they are supported in the frame A and provided with pressure-levers $a$ and $a'$, as is usual. These rolls are driven from a shaft, C, and by means of miter-gears $b$, which unite the said shaft with the shafts of the lower rolls. The upper and lower shafts are connected by means of gears $b'$.

The rough plank denoted by C', a section of which is shown in Fig. XIV, is entered between the rolls B B, and as it advances to the rolls B' B' one of its edges comes in contact with the vertical cutter-head D, and is dressed. (See Fig. XV.) The cutter-head D is only used when the plank is not parallel at its edges, has bark thereon, or is not of the exact width desired. The dressed edge of the plank is then forced against the guide-strip $c$ by means of springs $c'$, and remains in contact therewith until the completion of the entire operation. The plank now passes between the rolls B' B' and under the top dressing-head, D', which planes its upper surface. The plank now presents the appearance shown in Fig. XVI. The dressing-head D' is of the kind ordinarily used in machines of this class, and needs no description herein. It has pulleys $d$ at the ends of its shaft, which are driven by means of belts $d'$ from the pulley E, to which motion is imparted as hereinafter described. The plank next passes to a second cutter-head, F, having knives adapted to cut a series of channels $e e'$, as shown in Fig. XVII. The shaft of the cutter-head F has pulleys $f$, similar to the ones $d$, and they are driven by the belt $f'$ from the pulley E'. This belt passes over the pulley E, as shown in Fig. II, and serves to drive it. The main driving-shaft is denoted by F', and it has a main-pulley, F'', which receives its motion through the medium of a belt, G; but I do not limit myself to any peculiar arrangement of pulleys and belts to effect the rotation of the various cutter-heads herein shown. The plank now enters between the third pair of rolls, G', which are driven by means of miter-gears $g$ from the shaft C, in a manner similar to the ones B B' and connected by spur-wheels $g'$. After passing from the rolls G' the plank is dressed at its under side by means of a second dressing-head, H, which corresponds in all essential particulars with the first dressing-head, D'. The plank now presents the appearance shown in Fig. XVIII. The plank next comes in contact with the second channeling cutter-head, H', which is similar to the one, F, and channels are cut in its under side (See Fig. XIX.) The under channels are denoted by $h\,h'$.

Pressure-bars I serve to prevent the plank from being raised by the cutter-heads H and H'.

I' I' are circular saws driven in any suitable manner and situated in the rear of the second and lower channeling-head, H', to rip the plank at the channels into a series of boards, as shown in Fig. XX; and it will be seen that the saws operate at one edge of the grooves $e$ and $h$, which are the narrow ones, and centrally of the ones $e'$ and $h'$. By this means the five boards which result from the action of the circular saws are each provided with an unfinished tongue at one edge. It will be understood that I do not restrict myself to any particular number of boards into which the plank is ripped, as the number depends on the width of the plank or the width of the boards, which may be varied. The boards now pass collectively between the fourth pair of rolls, J, which are similar to those hereinbefore described, and by them conveyed between the rolls J' and K, the one, J', of which has an intermittent vertical movement, as and for purposes hereinafter described. Of the two rolls J' and K, the latter only is a driving one, the former merely exerting a pressure to keep the boards in contact with the latter. The boards are then fed to the rolls K' and L, and immediately before entering between them pass under a small roller, L', on a bar, $i$, supported at the ends by arms $i'$. These arms are fastened to studs $j\,j'$, which rest in bearings $k$ on the frame A. The stud $j'$ has an extension, $k'$, in the form of an arm, which is connected to a semicircular collar, $l$, with pins $l'$, which rest in a groove, $m$, in a clutch, $m'$, adapted to slide on a feather in the shaft M. M' is a clutch placed loosely on the shaft M, with a spur-wheel, $n$, attached thereto, in gear with a spur-wheel, $n'$, on the shaft C.

The shaft C is driven from the main shaft F', as follows: A pulley, $o$, on the shaft F', is united with another pulley, $o'$, on the shaft $p$ by means of a belt, $p'$. A train of gearing, denoted by $q\,q$, (see Figs. II and V,) communicates movement from the shaft $p$ to one end of the lower roll, K, and the other end of the said roll is provided with a miter-wheel, $q'$, in gear with a similar miter-wheel, $r$, on the shaft C. From this it will be seen that the shaft C is in constant rotation when the machine is in operation. As the boards come in contact with the small roller L' the same is raised, in view of its normal position being slightly below the upper surface of the boards. In the elevation of the small roller L' and the bar $i$, on which it revolves, the arms $i'$ are moved forward and the clutch $m'$ thrown in contact with the similar clutch, M', on the shaft M, through the medium of the extension $k'$ on the stud $j'$, the circular collar $l$, and the pins $l'$, which rest in the groove $m$ in the longitudinally-moving clutch. By this means the shaft M is put in revolution before the boards reach the rolls K' and L. At this time the boards are held tightly to the lower roll, K, by the pressure of the upper one, J', and as the next operation is the separation of the boards, it is necessary as a preliminary measure that this pressure should be removed. To accomplish this, I adapt the bearing-boxes $r'$ of the roll J' to slide in the frame-work which supports them, and connect the said bearings to the bell-cranks $s\,s$ and $s'\,s'$. The bell-cranks $s$ are connected to the ones $s'$ by means of rods N, (see particularly Fig. XI,) in order that both ends of the roll may be equally elevated and depressed when in operation. The bell-cranks $s$ have arms N', with rollers $t$ at their lower ends, which bear against cams O on the shaft M. O' O' are beveled wheels on the shaft M, in gear with similar wheels, P, on vertical shafts $t'$, which are suitably supported in the frame A.

P' P' are disks keyed to the lower ends of the vertical shafts $t'$, and $u\,u$ are pins projecting from the under faces of the said disks.

Q Q are extensible separators for the board, and they consist of a series of diagonal bars, $u'$, pivoted together after the manner of "lazy-tongs," and attached to the under side of a track, Q'. At the points of intersection of the bars $u'$ are situated blocks $v$, (see particularly Figs. X and XII,) which slide between the grooved rails of the track Q'. Each block $v$ has a separating-finger, $v'$, pivoted thereto, and the pins $w$, which connect the said fingers to the blocks, rest in slots $w'$, which admit of their being adjusted. The fingers $v'$ are weighted to retain them yieldingly in an upright position. The pins $u$ on the disks P' are united to the separators Q, at $x$, by means of connecting-rods $x'$, (see particularly Figs. VII, VIII, and IX,) and in one revolution of the said disks the separators are first extended and then contracted.

Supposing the boards have just raised the roller L', the shaft M is put in motion, as before described, which causes the roll J to be raised from contact with the board, and while the roll is thus elevated the disks revolve and the separators are extended. In this extension of the separators the fingers $v'$, which have been properly set, enter the channels $h\,h'$ and force outward all the boards except the one next to the guide-strip $c$, and place them in the positions shown in full lines, Figs. V and VI, and in dotted lines, Fig. VII.

As it requires considerable force to bring the clutches $m'$ and M' into full engagement, I do not depend entirely on the pressure of the boards or the roller L', but effect the result with a cam, R, keyed to the shaft M. The semicircular collar $l$ has friction-rollers $y$, which follow the face of the cam in its revolution, and are forced in, carrying with them the clutch $m'$. During the time that the cam R is forcing the two clutches $m'$ and M' together the sections of the board are being separated, as before described, and the roller L' therefore becomes inoperative, and would, if released, drop between the boards. (See Fig. VII.) The cam R, however, keeps the clutches together, and the extension-arm $k'$ in its extreme angular position. As the cam completes its revolution, the extension-arm $k'$ is carried back, and the weight of the arm $i'$, bar $i$, and the roller L' effects a disengagement of the clutches and allows the pressure-roll J' to fall on the separator-boards, the forward end of which have at that time entered between the rolls K' and L. The forward ends of the separated boards now enter passages R', formed of bars S, which are adjustable in position and pass to the cutter-heads S' and T. The cutter-heads S' groove the plain edges of the boards and prepare them to receive the tongues. They also bevel the edges T', as shown in Fig. XXI.

The cutter-heads T round the ends of the tongues and bevel the adjoining edges U, as shown also in Fig. XXI. The object of beveling the edges T' and U is to give the board some lateral compressibility and effect a tight joint. The completed boards are now carried off by the rolls U'. I have described the tongued and grooved boards as planed on both sides, and such material is known in the market as "partition-stuff."

In what is termed "flooring," the upper side only of the board is planed, and to produce it the under-side dressing-head will not be required.

It is evident that a great variety of forms of boards may be produced with this machine by merely changing the character of the cutters employed—for instance, weather-boarding of different kinds, such as shown in Figs. XXII, XXIII, and XXIV, can be worked equally as well and as satisfactory as flooring and partition-stuff. In Fig. XXV the channeling-heads are placed in advance of the surface-dressers. In Fig. XXVI is shown parts of two machines or a double machine, with the operating mechanism of both driven by a single shaft, which has been hereinbefore denoted by C, and a single driving-pulley. In this design two frames are employed where the machines approach each other, but it is evident that a single frame constructed as shown in Fig. XXVII, could be used, if desired.

The saws which I employ are only about one thirty-second part of an inch in thickness, and there is practically no waste in ripping the boards. While I prefer separating devices for the boards, which consist of pivoted bars, after the manner of "lazy-tongs," and fingers to enter the channels where the boards are to be separated, I do not wish to be restricted to the construction shown, as my invention extends broadly to the construction and combination of devices for the lateral separation of boards after being channeled and sawed or cut from a plank.

I claim as my invention—

1. In a machine for making tongue-and-groove flooring, the combination of the frame thereof, suitable feed-rolls to carry the plank to be operated on longitudinally of the said frame, rotary shafts carrying surface-dressing cutters, rotary shafts with cutters adapted to groove the plank longitudinally thereof arranged above and below the said plank, rotary shafts carrying circular saws arranged to rip the plank at the channels into boards, grasping devices to engage with the boards and separate them laterally and parallelly, and vertical rotary shafts provided with cutters arranged to groove the edges of the separated boards which are not furnished with tongues, all the said elements being located in consecutive order, as described, and means to effect their joint operation, substantially as specified.

2. In a machine for making tongue-and-groove flooring, the combination of the frame thereof, and suitable feed-rolls to carry the plank to be operated on longitudinally of the said frame, rotary shafts carrying surface-dressing cutters, rotary shafts with cutters adapted to groove the plank longitudinally thereof, arranged above and below the said plank, rotary shafts carrying circular saws arranged to rip the plank at the channels into boards, grasping devices to engage with the boards and separate them laterally and parallelly, vertical rotary shafts provided with cutters arranged to groove the edges of the separated boards which are not furnished with tongues, and vertical revoluble shafts fitted with cutters against which the said boards are forced by means of rolls to bevel the edges of the boards and round the tongues, all the said elements being located in consecutive order, as described, and means to effect their joint operation, substantially as specified.

3. In a machine for making tongue-and-groove flooring, the combination of the frame thereof, and suitable feed-rolls to carry the plank to be operated on longitudinally of the said frame, circular saws to rip up the said plank into boards, and devices to receive and laterally and parallelly separate the boards, which consist, substantially, of a series of diagonal bars pivoted together and attached to a stationary part of the machine, grasping devices situated at the intersection of the pivoted diagonal bars to engage with the boards, guides for the grasping-fingers, and means to effect the extension and contraction of the diagonal pivoted bars, substantially as specified.

4. In a machine for making tongue-and-groove flooring, devices for laterally separating boards cut from a plank to admit of their being grooved at the edges, which consists of a series of diagonal bars pivoted together and attached to a stationary part of the machine to which the boards are delivered, grasping devices situated at the intersection of the pivoted diagonal bars to engage with the boards, guides for the engaging-fingers, and means to effect the extension and contraction of the said pivoted bars, all combined, substantially as specified.

5. In a machine for making tongue-and-groove flooring, devices for laterally separating boards cut from a plank to admit of their being grooved at the edge, which consists in the combination of diagonal bars pivoted together and attached to a stationary part of the machine to which the boards are delivered, grasping devices situated at the intersection of the pivoted diagonal bars to engage with the boards, guides for the grasping devices, a revoluble crank-disk having a crank-pin, and a rod which connects the said pin with the said pivoted diagonal bars, whereby the same are alternately distended and contracted, substantially as and for the purpose specified.

6. In a machine for making tongue-and-groove flooring, devices for laterally separating boards cut from a plank to admit of their being grooved at the edge, which consists of the combination of diagonal bars pivoted together and attached to a stationary part of the machine to which the boards are delivered, grasping devices situated at the intersection of the pivoted diagonal bars to engage with the boards, guides for the grasping devices, means to effect the alternate extension and contraction of the said pivoted diagonal bars, and a roller situated near the said diagonal bars and transversely of the path of the moving boards, with suitable mechanism to alternately raise and lower the same to release and hold the boards and to coact with the distensible diagonal pivoted bars, substantially as and for the purpose specified.

7. As means to effect the rotation of the shaft M, for the purpose described, from the boards while the same are moving longitudinally of the machine, the continuously-rotating shaft C, having the gear $n'$, loose gear-wheel $n$ on the shaft M in engagement with the one $n'$, the clutch M', fastened to the gear $n$, the sliding clutch $m'$ on the shaft M, a roller suspended over the path of the boards and slightly below their upper surface, and suitable levers and rods to connect the said roller with the clutch $m'$, whereby in the elevation of the said roller the clutch $m'$ is forced to engage with the one M', all combined substantially as specified.

8. As a means to force and hold the clutches $m'$ and M' in full engagement after the one, $m'$, has been brought in contact with the other, M', through the agency of the roller L and its connections, the combination, with the shaft M, and clutch $m'$, of the cam R, keyed to the said shaft and in engagement with the collar and its mechanism, whereby the clutch $m'$ is moved toward the one M', substantially as specified.

GREENLEAF JOHNSON, JR.

Witnesses:
CHARLES W. ARNOLD,
DANIEL FISHER.